(12) United States Patent
Knoedgen et al.

(10) Patent No.: US 8,076,948 B2
(45) Date of Patent: Dec. 13, 2011

(54) DISTANCE MEASUREMENT WITH CAPACITIVE SENSOR

(75) Inventors: Horst Knoedgen, Munich (DE); Frank Kronmueller, Neudenau (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 623 days.

(21) Appl. No.: 12/290,386

(22) Filed: Oct. 30, 2008

(65) Prior Publication Data
US 2010/0097015 A1 Apr. 22, 2010

(30) Foreign Application Priority Data
Oct. 16, 2008 (EP) .................................... 08392011

(51) Int. Cl.
*G01B 7/14* (2006.01)
*G01D 5/241* (2006.01)
(52) U.S. Cl. ......... 324/658; 324/671; 318/652; 318/466
(58) Field of Classification Search .................. 324/658, 324/661–663, 671, 686, 688; 318/652, 400.08, 318/400.16, 466
See application file for complete search history.

(56) References Cited

U.S. PATENT DOCUMENTS

| | | | | |
|---|---|---|---|---|
| 5,910,781 A * | 6/1999 | Kawamoto et al. | ...... | 340/870.37 |
| 6,356,085 B1 * | 3/2002 | Ryat et al. | ...... | 324/658 |
| 6,366,099 B1 * | 4/2002 | Reddi | ...... | 324/678 |
| 6,486,681 B1 | 11/2002 | Weber et al. | | |
| 6,720,777 B2 * | 4/2004 | Wang | ...... | 324/680 |
| 6,731,121 B1 * | 5/2004 | Hsu et al. | ...... | 324/678 |
| 6,737,648 B2 * | 5/2004 | Fedder et al. | ...... | 250/332 |
| 6,949,937 B2 * | 9/2005 | Knoedgen | ...... | 324/658 |
| 7,256,590 B2 | 8/2007 | Kitaoka | | |
| 7,956,621 B2 * | 6/2011 | Hollocher et al. | ...... | 324/661 |
| 2005/0088184 A1 | 4/2005 | Burdick et al. | | |
| 2008/0037155 A1 | 2/2008 | Hirano et al. | | |
| 2008/0069413 A1 * | 3/2008 | Riedijk et al. | ...... | 382/124 |
| 2008/0258044 A1 * | 10/2008 | Schrey et al. | ...... | 250/208.1 |

FOREIGN PATENT DOCUMENTS

| | | |
|---|---|---|
| EP | 1 548 409 | 6/2005 |
| EP | 08392011.6-1524 | 2/2009 |
| WO | WO 01/31351 | 5/2001 |

OTHER PUBLICATIONS

"Correlated Double Sampling in Capacitive Position Sensing Circuits for Micromachined Applications," by Wongkomet et al., 1998 IEEE, FP1-13.1 , pp. 723-726, 0-7803-5146-0/98.

* cited by examiner

*Primary Examiner* — Eduardo Colon
(74) *Attorney, Agent, or Firm* — Saile Ackerman LLC; Stephen B. Ackerman (57) ABSTRACT

Circuits and methods to read out capacitive sensors for distance measurement used by a position control system having a high accuracy and low noise have been disclosed. The ratio or difference of the capacitances of two sensor capacitors is used to determine the distance of an object from a target position. A sense amplifier is using auto-zero methods to achieve a long term stability. A sample-and-hold circuit using double correlated sampling methods minimizes noise. Low cost capacitors can be used with the sample-and-hold circuit because not the absolute value of capacitances but only the ratio of capacitances are relevant. A high resolution is ensured also by significant over-sampling of the control loop.

19 Claims, 6 Drawing Sheets

DISTANCE MEASUREMENT WITH CAPACITIVE SENSOR

BACKGROUND OF THE INVENTION (1) Field of the Invention

This invention relates generally to the field of distance measurement and relates more specifically to distance measurement using capacitive sensors.

(2) Description of the Prior Art

Capacitive sensors are capacitors separated by a dielectric material, often the electrodes used have the form of plates. Using the properties and knowledge of electric field and capacitance between separated charged electrodes/plates it is possible to retrieve information about distance, pressure, etc. The distance between the plates or the active area of neighboring plates, i.e. the capacitance can be used to measure a distance of objects.

The capacitance C is a measure of the charge stored on each plate for a given voltage where $$C = \frac{\varepsilon \times A}{d},$$

wherein $\in$ is the permittivity of the dielectric, A is the area of the plates and d is the distance as the plates are separated. As the plates separate there is a direct relation between the capacitance and the distance d of the plates. In case the plates shift in parallel there is also a direct relation between the distance of the shift of the plates and the capacitance. This relationship can be used in sensing position and proximity by using the capacitance relationship to displacement.

It is a challenge for the designers of capacitive distance measurement systems to achieve a high accuracy, a long term stability and a low-cost design.

There are patents or patent publications dealing capacitive distance measurement systems:

U.S. Patent Publication (US 2005/0088184 to Burdick et al.) teaches a capacitive sensor that includes a variable capacitor transducer that varies its capacitance with changes in an environmental parameter. The present invention is adapted to measure any linear parameter such as pressure, force, or distance. The sensor of the present invention is compact, inexpensive to make, and easily fabricated using commonly available components. Furthermore, it is not susceptible to errors caused by vibration, acceleration, and its orientation to the earth's gravitational field. The output of the capacitive sensor does not substantially drift with changes in temperature.

U.S. Patent (U.S. Pat. No. 7,256,590 to Kitaoka) discloses a measuring apparatus having a probe that faces a surface of a target and is configured to supply AC current to the surface, measuring a voltage drop through a space between the probe and the surface, and obtaining a distance between the probe and the surface in accordance with the measured voltage drop. The apparatus includes a ground member facing, and apart from, the surface and configured to ground the surface by capacitive coupling, and a stage configured to hold either of the target and the probe and to move to define a measurement area on the surface. The ground member is configured so that the ground member faces all areas of the surface with respect to each of a plurality of measurement areas on the surface defined by a position of the stage.

U.S. Patent (U.S. Pat. No. 6,486,681 to Weber et al.) discloses a measuring circuit for a capacitive sensor for distance measurement and/or space monitoring comprising sensor wire and shielding electrode, a sine signal is applied to the shielding electrode. The sensor wire is connected, via a shielded cable, with one input of an input amplifier which serves as current-voltage converter and whose supply voltage is likewise influenced by the sine signal. The output of the input amplifier is connected with one input of a phase-dependent rectifier arrangement, the sine signal is applied to the other input of the phase-dependent rectifier arrangement, and its output is connected to an analog-to-digital converter.

SUMMARY OF THE INVENTION

A principal object of the present invention is to achieve systems and methods to read out capacitive sensors for distance measurement used by a position control system having a high accuracy.

A further object of the present invention is to achieve systems and methods to read out capacitive sensors for distance measurement used by a position control system having long term stability by utilizing the ratio of the capacitances of sensor capacitors.

A further object of the present invention is to achieve systems and methods to read out capacitive sensors for distance measurement used by a position control system having long-term stability by using auto-zero methods.

Another object of the present invention is to achieve systems and methods to read out capacitive sensors for distance measurement used by a position control system having low noise by using double correlated sampling methods.

Another object of the present invention is to achieve systems and methods to read out capacitive sensors for distance measurement used by a position control system having high resolution by using over-sampling in a control loop.

Another object of the present invention is to achieve systems and methods to read out capacitive sensors for distance measurement used by a position control system having low cost capacitors for a sample-and hold circuit.

In accordance with the objects of this invention a method to read out capacitive sensors for distance measurement used by a position control system having a high accuracy and low noise has been achieved. The method invented comprises, first, the following steps: (1) providing two sensor capacitors, wherein at least one plate of said sensor capacitor is fastened on an object whose position is to be controlled, a sense amplifier stage, a digital controller controlling a motor, a digital-to-analog converter and a comparator, (2) setting a reference voltage dependent upon a target position to be reached, and (3) measuring sequentially voltages across said sensor capacitors using said reference voltage as input voltage on a first terminal of each sensor capacitor. The next process steps are (4) checking if both voltages are equal and, if positive go to step (7), otherwise go to step (5), (5) moving said object in a direction according to difference of the voltages measured; (6) measuring sequentially voltages across said two sensor capacitors using last voltage measured across each sensor capacitor as input voltage on a first terminal of each correspondent sensor capacitor and go to step (4), and (7) target position is reached.

In accordance with the objects of this invention a system to read out capacitive sensors for distance measurement used by a position control system having a high accuracy and low noise has been achieved. The system invented comprises, first, a digital controller, having inputs and outputs, wherein first inputs are signals from a comparator, a second input is a reference voltage defining a target position of an object, and a first output are control signals for a motor moving said object, a second output are two digital signals defining an actual position of said object, and a third output are signals to control the readout process chain, said motor, a digital-to-analog converter converting each one of said two digital output signals of said digital controller to an analog voltage, and a multiplexing means modulating each of said analog voltage output of said digital-to-analog converter having two outputs, wherein alternately a first output is switched to a first plate of a first sensor capacitor and a second output is switched to a first plate of a second sensor capacitor. Furthermore the system comprises said two sensor capacitors having each one of their plates fastened on said object and one of their plates fastened on a fixed position, a sense amplifier stage having two inputs and an output, wherein a first input is connected to second plates of said sense capacitors and a second input is connected to a reference voltage and its output is connected to a sample-and-hold circuit, said sample-and hold-circuit having two branches, wherein each branch is comprising capacitors and wherein a first branch of the sample-and hold circuit is holding a voltage measured across said first sensor capacitor and a second branch is holding a voltage measured across said second sensor capacitor and wherein an output of said first branch is connected to an input of a first branch of a low-pass filter and an output of said second branch of the sample-and-hold circuit is connected to an input of a second branch of the low-pass filter. Moreover the system comprises said low-pass filter having two branches, wherein the output of the first branch is connected to a first input of a differential amplifier and the output of a second branch is connected to a second input of said differential amplifier, said differential amplifier having differential outputs wherein both differential outputs are the inputs of a comparator, and said comparator, comparing said differential inputs, having a digital output connected to said digital controller.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to read-out capacitive sensors for e.g. distance measurement to achieve a high accuracy and low noise by using over-sampling, auto-zero and correlated double sampling (CDS) methods. The read-out method invented can also be used for a multitude of other applications, e.g. as any other capacitance measurements or for measurements of a distance of human parts as e.g. a finger or hand, which can be used for switching applications because the fluids contained in an body have an other dielectric value than air and so an approximation of a person or hand can be detected by a changed capacitance of a sensor plate.

Figure 1:
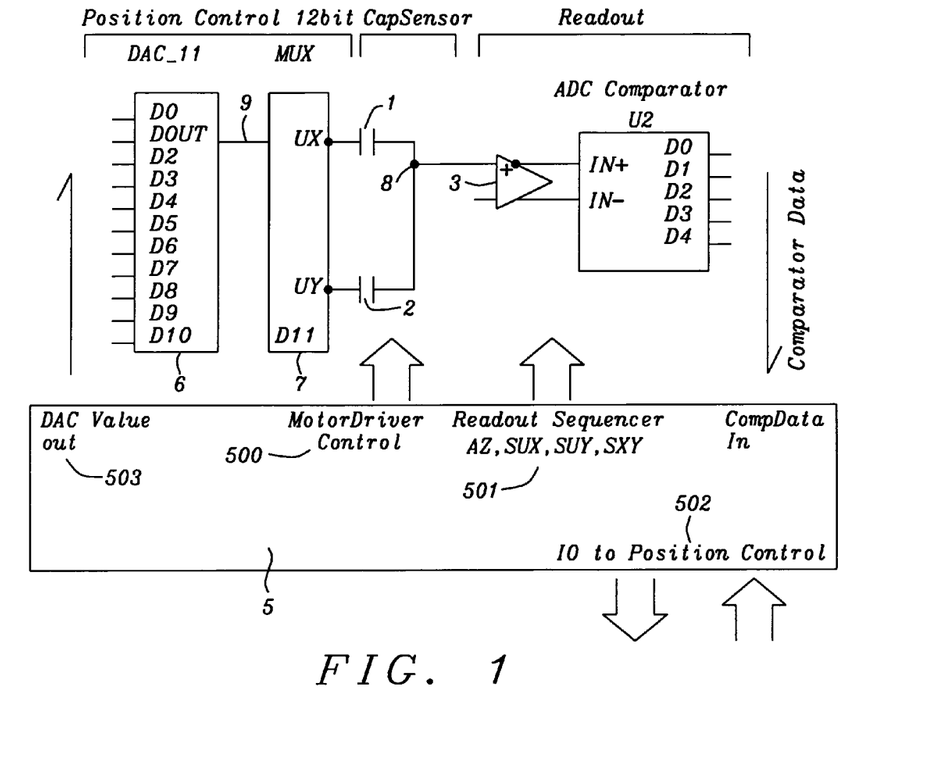
FIG. 1 illustrates a block diagram showing the principal building blocks of a position control system using the capacitive sensor read out method invented.

FIG. 1 illustrates a block diagram showing the principal building blocks of a position control system using the capacitive sensor read out method invented. A key point of the present invention is the read-out method using a pair of capacitive sensors to determine a position of an object, carrying one or more sensor plates, that is to be moved to a target position. The read-out of the present invention provides the information "too much to the right" or "too much to the left" in regard of a target position or "target position reached". It is also possible to determine the distance to a target position in any number of stages, i.e. for instance "too far to the right", "right", "a bit on the right", "on target", "a bit on the left", "left", and "too far on the left". In case the object has reached the target position a comparator, checking the actual position of the object, starts to toggle around the target position. In a preferred embodiment a position control application using the read-out method of the present invention is disclosed.

The position control system shown in FIG. 1 measures the actual position of an object and controls the movement of the object in order to reach a target position with a high resolution. Simulation runs of the present invention have demonstrated an accuracy of 1 µm.

The distance between the actual position of the object and the target position is measured by sensing the capacitance of two external sensor capacitors 1 and 2 via a correspondent voltage swing across these capacitors and the following processing of the ratios of these capacitances. The present invention discloses using two sensor capacitors 1 and 2 in order to be able to perform the distance measurement based upon the difference of the capacitances of both sensor capacitors 1 and 2. The voltage swing across sensor capacitor 1 is Ux, the voltage swing across sensor capacitor 2 is Uy. The voltage signals Ux and Uy, which are measured sequentially, are stabilized and amplified sequentially by a differential amplifier stage 3 having a reference voltage as second input. The output of the amplifier stage 3 is received by analog-to-digital comparator stage 4. The analog-to-digital comparator stage 4, which is also a part of the readout block, performs a comparison of both voltages Ux and Ux. The result of this comparison is provided digitally to a digital control block 5. In a preferred embodiment the output of stage 4 comprises 5 bits. Other configurations of the output of stage 4 are possible as well.

The position control system comprises furthermore a digital control block 5, receiving input from the analog-to-digital comparator stage 4. The digital control block 5 comprises a driver 500 for a motor to move said object to a target position, a readout sequencer 501, an I/O driver 502 to set target positions and to output position information, and an output driver 503 to drive the digital output data of the control block 5 to a digital-to-analog converter 6.

In a preferred embodiment of the invention the motor to move said object is a linear motor, e.g. a sledge motor, other types of motors could be used alternatively as well. The comparator output from stage 4 is used to drive the motor to move the object to be positioned to a target position.

Furthermore the control block 5 comprises an external I/O driver. In a preferred embodiment this I/O driver is connected a sensing device of an autofocus device, receiving a signal in regard of a target position and sending a signal in regard of the position of camera lens system. For other applications, this I/O driver sends and receives information about the object positioning. Furthermore a Readout Sequencer 501 generates signals AZ, SUX, SUY, SXY to control the readout process chain. These signals will be described in detail later.

The digital controller 5 outputs sequentially two digital signals, depending upon the measurement of Ux and Uy, to digital-to-analog converter (DAC) 6. In a preferred embodiment the distance to be measured is described using 11 bits (D0 . . . D10). Each of these two digital signals is initially dependent upon an initial reference voltage and then upon a previous measurement of the voltage swing across correspondent sensor capacitor 1 or 2. The digital-to-analog converter (DAC) 6 converts these digital signals sequentially to analog voltages, representing previous measurements of Ux and Uy.

The multiplexer 7 modulates sequentially the analog output voltage 9 from the DAC 6 in a frequency range of about 500 kHz in order to generate alternating voltages across sensor capacitors 1 and 2. The multiplexing of both signals is performed non-overlapping and allows alternately sensing the voltage swing of sensor capacitors 1 and 2. A $12^{th}$ bit D11 is part of the digital position output code. It defines whether the 11 bit target position is on the left hand side LHS (0) or on the right hand side RHS (1) of the target position. As outlined later in a multiplexer control table in more details the $12^{th}$ bit selects Umax or DAC depending on UX or UY sampling phase.

In case the analog voltages 15 and 16 are equal and the capacitances of both sensor capacitors 6 and 7 are equal, the voltage swing at node 8, i.e. the input of the operational amplifier 8 will be zero.

Figure 4A:
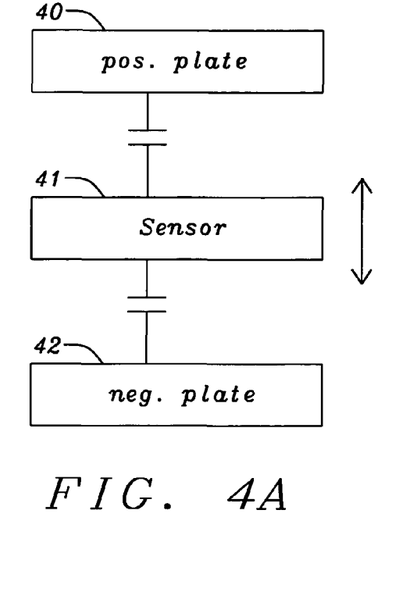
FIGS. 4a-c illustrate alternative arrangements of sensor capacitors comprising each a positive driving plate, a moving sensor plate, and a negative driving plate.
Figure 4B:
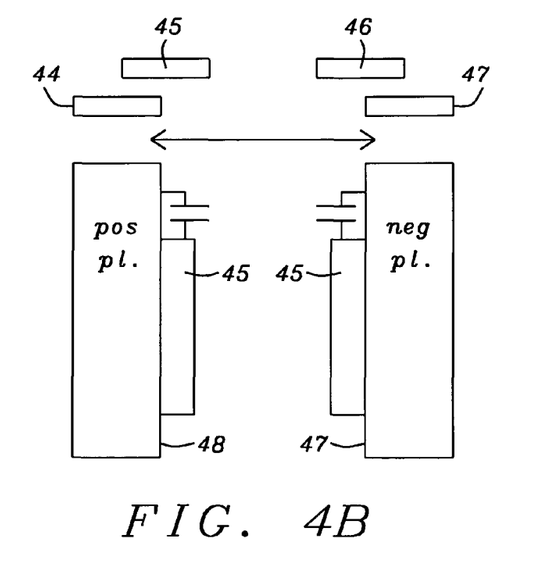
Figure 4C:
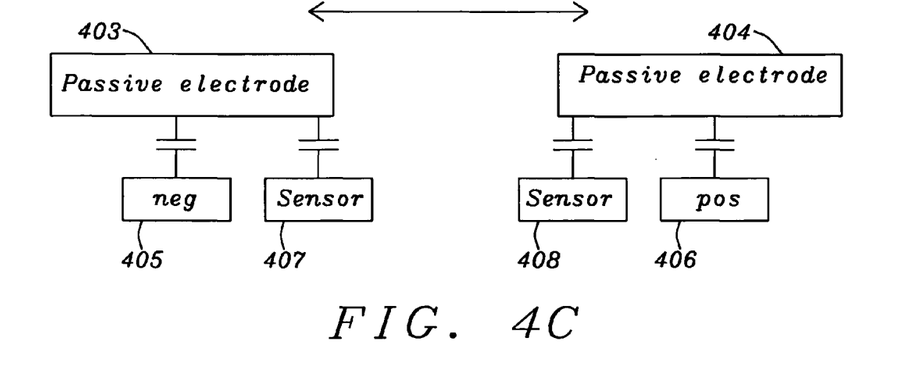

The arrangement of the plates of sensor capacitors 1 and 2 can be deployed in multiple ways as long as the position measurement is based upon measurements of differential capacitances. FIGS. 4a-c show three alternatives of the arrangement of the plates of sensor capacitors. The capacitor symbols in FIGS. 4a-c illustrate the capacitances between the plates wherein the value of capacitances change as the movable plates are being moved.

FIG. 4a illustrates a simple arrangement of sensor capacitors comprising a positive driving plate 40, a moving sensor plate 41, and a negative driving plate 42. The voltage Ux can be measured across driving plate 40 and sensor plate 41, the voltage Uy can be measured across driving plate 42 and sensor plate 41. In most applications sensor plate 41 is be the moving plate, alternatively it is possible that the positive and negative driving plates 40 and 42 are the moving plates. In a preferred embodiment sensor plate 41 is moving between the positive and negative driving plates 40 and 42, as indicated by the double arrow. The capacitance between the positive plate 40 and sensor plate 41 increases during the movement of the sensor plate 41 towards the positive plate 41 and the capacitance between the negative plate 42 and the sensor plate 41 decreases accordingly. The result is a differential capacitor wherein its ratio of capacitance changes by any movement of one of the types of plates.

FIG. 4b illustrates another possible arrangement of sensor capacitors comprising a positive driving plate 44, sensor plates 45 and 46, and a negative driving plate 47. The double arrow indicates the possible directions of movements of either sensor plates 45 and 46 or driving plates 44 and 47. The sensor plates 45 and 46 are electrical connected. The sensor plates 45 and 46 are mechanically coupled and also the positive and negative driving plates 44 and 47 are mechanically coupled. Using the arrangement of FIG. 4b it is also not relevant which type of plates is moving.

FIG. 4c discloses moreover another possible arrangement of sensor capacitors. This arrangement comprises two passive electrodes 403 and 404, a negative plate 405, a positive plate 406 and two sensor plates 407 and 408. It is also not relevant which type of plates is moving. The capacitance between plates changes upon movement of plates The passive electrodes are mechanically coupled. They can be moved together in either direction. The sensor plates are electrically connected. In a preferred embodiment of the invention the passive electrodes are moving.

In a preferred embodiment one or more sensor plates are connected alternating to an input of the amplifier stage 3 and the positive/negative driver plates are connected to the Ux or correspondently to the Uy output of the multiplexer 7. Both sensor capacitors 1 and 2 plates are acting as voltage divider, with one plate is being connected to Ux and the other to Uy.

The moving plates of sensor capacitors 1 and 2 are fastened on the movable object whose position is to be measured and adjacently to the moving plates are correspondent plates deployed having a fixed position. By moving the movable plate of a sensor capacitor 1 by a motor the capacitance of sensor capacitor 1 is either increased or decreased and at the same time the capacitance of sensor capacitor 2 is changed in the opposite direction, i.e. if the capacitance of sensor capacitor 1 is increased, the capacitance of sensor capacitor 2 is decreased in the same ratio and vice versa. The difference or the ratio between the capacitances of capacitive sensor 1 and capacitive sensor 2 is a measure for the position of the object or the distance of the object from a target position. The voltage swing of both sensor capacitors 1 and 2 can either be adjusted by setting the correspondent output voltages of DAC 3 or by moving the capacitor plates.

The digital controller 5 outputs sequentially two digital signals depending upon the actual position of the object. Each of the two digital signals is initially dependent upon an initial reference voltage and then upon a previous measurement of the voltage swings Ux and Uy of the correspondent sensor capacitor 1 or 2. In a preferred embodiment of the invention maximum value Umax of Ux and Uy are used as such initial reference value and 11 bits per signal are used resulting in a 12 bit resolution of the distance from 0 to maximum distance. The digital-to analog converter (DAC) 6 converts these digital signals into analog voltages. Preferably same values Umax are used as initial reference voltages for Ux and Uy. Alternatively different values could be used for initial reference voltages for Ux and Uy.

DAC 6 converts the digital input signals into correspondent analog voltage 9. The multiplexer 7 modulates these voltages sequentially in a frequency range of about 500 kHz in order to generate alternating voltages across sensor capacitors 1 and 2. The multiplexer 7 switches non-overlapping and allows alternately sensing the voltage swing of sensor capacitor 1 and 2. A $12^{th}$ bit D11 controls to which sensor capacitor 1 or 2 the output voltage 9 of DAC 6 is applied. In case both analog voltages 9 and 10 are equal and the capacitances of both sensor capacitors 1 and 2 are equal, the voltage swing at node 8, i.e. the input of the amplifier stage 3 will be zero.

The position control of the present invention is performed by driving the voltage swing, via digital controller 5 and moving plates of sensor capacitors 1 and 2, at the input of the amplifier stage 3 to zero. If the capacitance of e.g. sensor capacitor 1 is higher than the capacitance of capacitor 2, the voltage swing of capacitor 1 will be reduced by moving the object, i.e. the moving sensor capacitor plate away from the fixed capacitor plate in order to reduce the capacitance of the sensor capacitor. The relative differences of capacitance between both sensor capacitors 1 and 2 can be adjusted by setting both output voltage 9 of DAC 6, followed by a correspondent movement of one or more sensor plates of sensor capacitors 1 and 2. These two voltages can be measured one after the other until the two voltages are equal, then the object has been reached a target position. By changing the ratio of both voltages the object is moving to another position.

Figure 2:
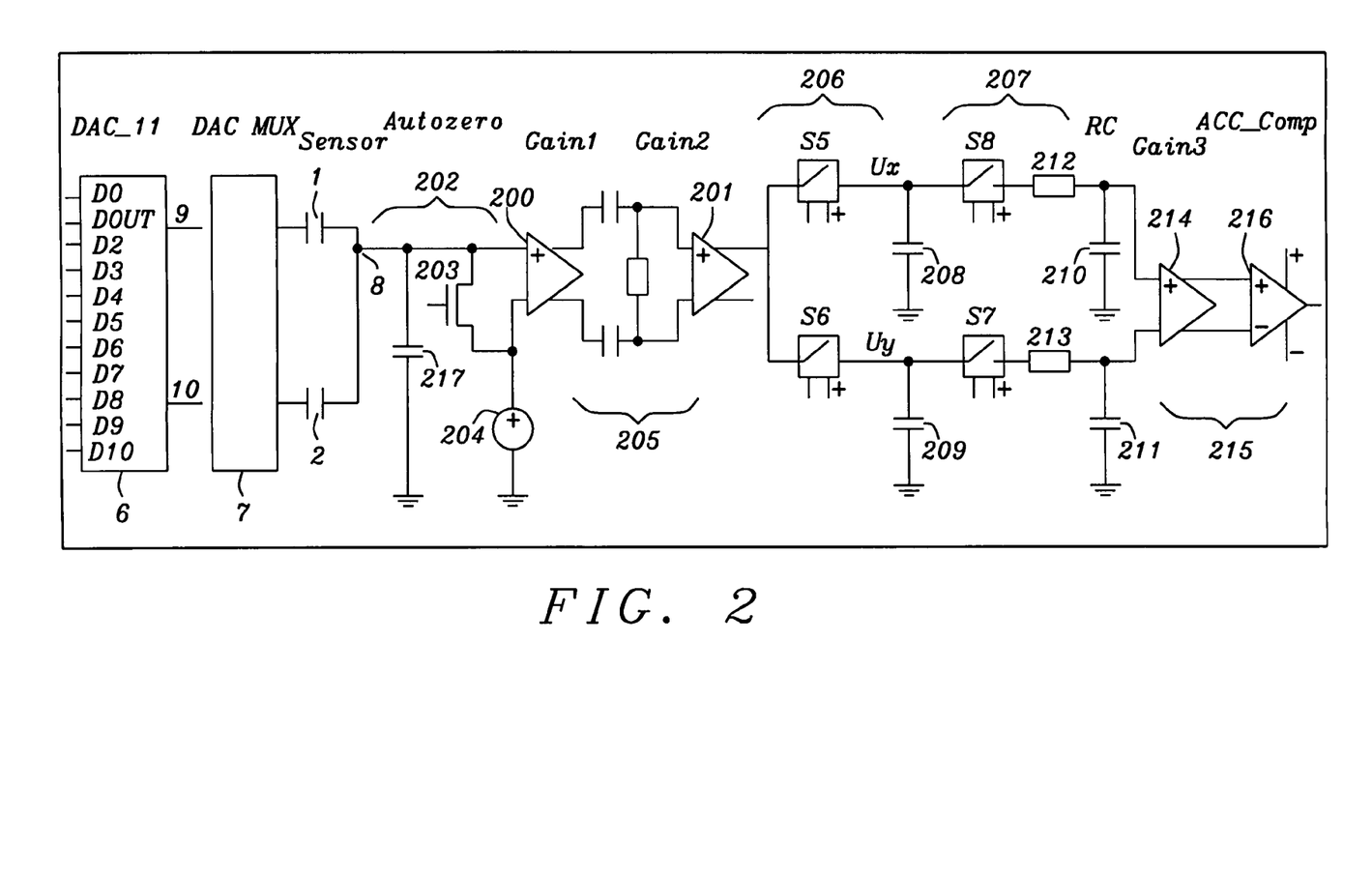
FIG. 2 shows in more details the capacitive read-out system of the present invention

FIG. 2 shows in more details the capacitive read-out system of the present invention, same numerals as in FIG. 1 are used to signify same components. The digital control block 5 including motor driver is not shown in FIG. 2.

As outlined above DAC 7 converts alternately both digital input signals dependent upon an initial reference voltage and then upon a previous measurement of the voltage swing across correspondent sensor capacitor 1 or 2. Multiplexer 7 modulates sequentially the analog output voltages from the DAC 6 in a frequency range of about 500 kHz in order to generate alternating voltages across sensor capacitors 1 or 2.

The signal at node 8 corresponds to the voltage swing across one of sensor capacitors 1 or 2. In an alternating mode the voltage swing is measured across one of the sensor capacitors 1 or 2. The amplifier stage 3, shown in FIG. 1, comprises two differential amplifiers 200 and 201.

Between both measurements the input of the amplifier 200 is set to zero by an auto-zero circuitry 202 in order to reduce noise. The system invented is using an auto-zero methodology, i.e. an automatic internal correction for offsets and/or drift at zero voltage input between the sensing of the each sensor capacitance. In a preferred embodiment the auto-zero circuitry 202 comprises a transistor switch and a voltage source. The auto-zero circuitry cancels low frequency noise below 100 KHz. Examples for such low frequency noise are DC leakage, 50/60 Hz noise, etc. Other auto-zero circuitries are possible as well.

Between the differential amplifiers 200 and 201 is a high pass filter 205, which filters DC-offset and low frequency noise of the first differential amplifier 200. In a preferred embodiment high pass filter 205 comprises a capacitor having a capacitance in the order of magnitude of 1 pF deployed at each output of differential amplifier 200 and a resistor of in the order of magnitude of 1 MOhm connected between the differential inputs of differential amplifier 201. Other capacitance and resistor values and layouts of a high pass filter are possible as well.

A correlated double sampling (CDS) stage 206 converts the 500 kHz modulated signal from differential amplifier 201 down into the baseband and a second sampling stage 207 with a low pass filter limits the upper bandwidth to 40 kHz.

The sequentially amplified signals from amplifier 201, representing values of Ux and Uy, are stored sequentially via switches S5 and S6 on sample-and-hold capacitors 208 and 209 in order to utilize correlated double sample (CDS) methods in detecting differences of capacitances of both sensor capacitances. Switches S5 and S6 are linked to multiplexer 7 to make sure that signals representing Ux and Uy are separately stored on sample-and-hold capacitors 208 and 209. Correlated double sample (CSD) reduces further the noise. In a preferred embodiment of the present invention the low-pass filter of the second sampling stage 207 is implemented symmetrically by an resistor/capacitor arrangement 210/212 and correspondently 211/213 in each of both branches of the circuit.

Furthermore silicon costs are reduced by avoiding process steps required for silicon capacitors. Low cost capacitors only are required for sample and hold capacitors because only the ratio of sensor capacitances are important and not the absolute values of the capacitors. In a preferred embodiment of the invention Poly Gate MOS capacitors are used for the sample-and-hold capacitors 208, 209, 210 and 211. Alternatively other low cost capacitors as e.g. diffusion gate, floating gate, or ferro electric capacitors could also be used.

A differential gain stage 214, which is part of comparator stage 215, boosts the differential signals, representing each either Ux or Uy before both voltages Ux and Uy are compared by a center ADC-comparator 216. The center ADC-comparator 216 is using the differential output voltage from gain stage 214 as input comparing the sampled voltage Ux with the sampled voltage Uy, and outputs the result of the comparison as a digital signal. If both voltages are the same then the desired position has been reached.

The operation of ADC-comparator 216 can be described by $$dXY = Ux - Uy.$$

If dXY>0 the object is right of target position and the result is described by a center bit=0.

If dXY<0 the object is left of target position and the result is described by a center bit=1.

The result of the comparison is fed back to digital controller 5. The output of the comparator 11 to the digital controller 5 signifies either "right of target position" (center bit "0") or "left of target position" (center bit "1"). In case the object has reached target position the motor drive is being reversed and therefore the comparator starts toggling, i.e. outputting alternately digital "01010101".

The comparator operation can be operated with a center comparator 216 alone as illustrated in FIG. 2. Additional comparator stages having defined positive and negative offsets can provide proximity information, which can be used to achieve a quasi-linear regulation behavior of a digital regulation as illustrated by FIG. 1. These comparator stages can be used to introduce increased motor speed if the object is far away from the target position and to reduce the motor speed if the object close to target position.

It should be understood that the present invention uses differences or ratio of the capacitances of sensor capacitors 1 and 2 and not the absolute value of the capacitances to sense the distance of the object from a target position. Therefore the parasitic capacitances of the sensor capacitors are not relevant because between the measurements of the voltage swings of the sensor capacitors the input of the sense amplifier 200 is set to zero. Therefore the noise of the system is extremely low and any change of capacitances due to the environment as temperature or humidity, etc. is not relevant for the resolution of the system. The input of the target position is an input to Digital Controller 5, from a higher control loop or direct user interface In order to control the movement of the object to a target position two measurements are performed, i.e. the capacitances of sensor capacitors 1 and 2 are measured one after the other in order to perform the position control relative to the right side of the total control range and then relative to the left side. These two measurements are repeated, including the correspondent movements of the motor, until the target position is reached.

Figure 5A:
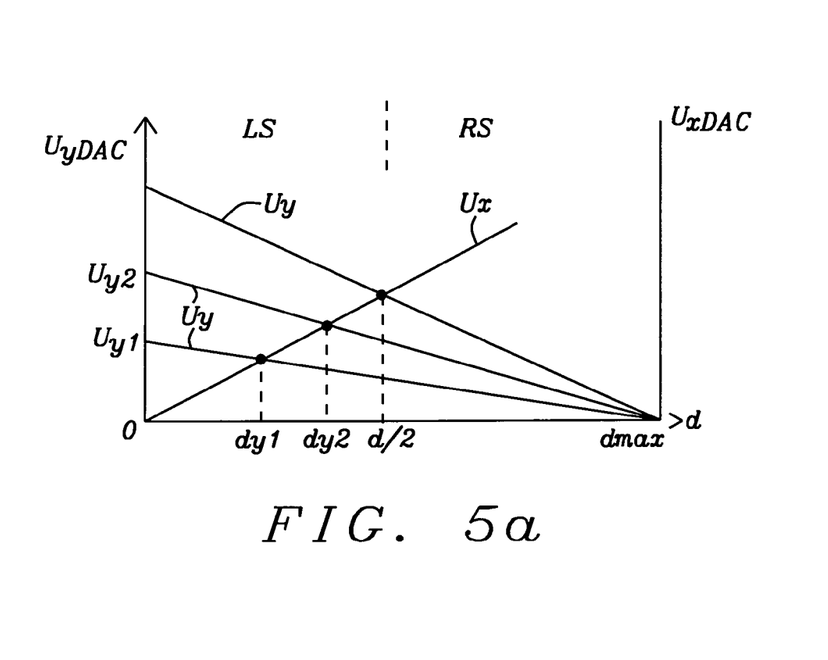
FIGS. 5a-b illustrates the basic principle of the method invented to control the position of the object.
Figure 5B:
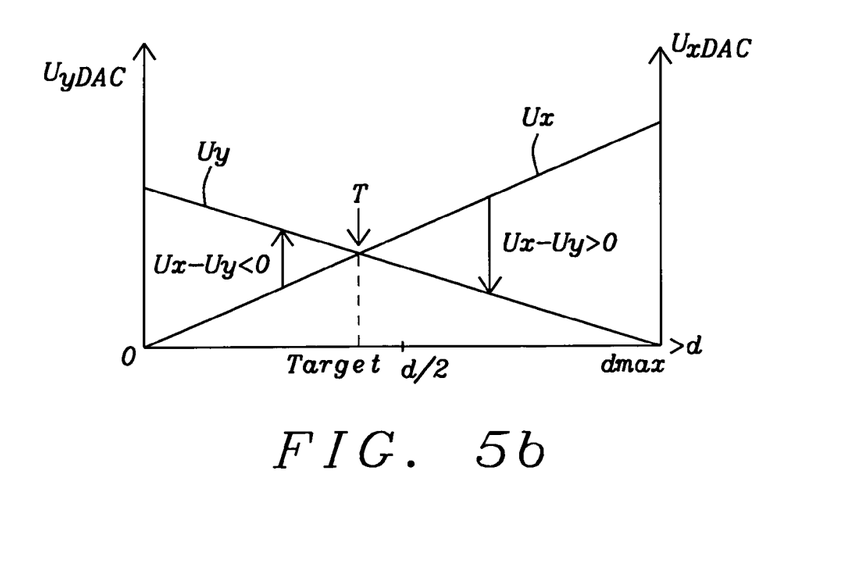

FIGS. 5a-b illustrate the basic principle of the control of the position of the object. The horizontal coordinate shows the range of the distance to be covered between zero and a maximum distance dmax and the target position of the object The position is drawn horizontally from an origin 0 to a maximum distance dmax. Vertically, to the left, is the DAC voltage Uydac; on the right side is correspondently Uxdac voltage.

The diagonal lines are representing the voltage dividing action of the two sensor capacitors 1 and 2 as a function of the actual distance d from an origin, signified by 0. The measured voltages $U_x$, $U_Y$ will be on their correspondent lines depending on the actual position of the object, driven by a motor, e.g. by a sledge motor.

Since always a pair of measurements is taken, one from Uxdac to GND (0) and the other from Uydac to GND, we get the linear functions of Ux and Uy depending upon distance d are achieved. The crossing defines the target position. If the two voltages are not equal this means the position is off-target.

If the Uxdac and UYdac voltages are equal and larger than zero then the target position is always in the middle (d/2). Generally, for best Signal-to-Noise one of both voltages Ux or Uy should be set to a maximum value, either Uxmax or correspondently Uymax. In a preferred embodiment of the invention voltage Uxmax equals voltage Uymax.

In order to set a target position in the e.g. left side LS the Uydac voltages are reduced, as shown in FIG. 5a by the three lines of Uy, resulting subsequently in a lowered, less steep linear function for Uy. The crossings of the Uy line with the unchanged Ux line will hence move to the left side depending on the exact Uydac voltage. The second line points still to Uxmax to maximize signal/noise S/N ratio.

FIG. 5b shows that on the right side of the target position T, Ux–Uy is greater than zero, and on the left side of the target position T, Ux–Uy is smaller than zero. As mentioned earlier the target position T is reached if Ux–Uy Setting the Uydac to 0 sets the target position to the origin 0. Reversing this scheme (X</>Y) defines the target position on the right side RS. On the other side keeping Uymax and setting Uxdac to 0 will set the target position to dmax.

Depending upon the actual position of the object the first measurement yields a voltage Ux correspondent to the actual position of the object related to the right side of the control range. Then a second measurement yields a voltage Uy correspondent to the position on the left side. For an illustrating example, if the object is in Pos1, the correspondent Uy voltage has the value Uy1, which is much higher than the correspondent voltage Ux1. The comparator 216 therefore issues a correspondent signal to the digital controller 5 to activate a motor to move to the right side and to apply voltage 9 or 10, which is correspondent to the actual position Pos1 to the correspondent DAC 6. The measurements of Ux and Uy are repeated based on the new values of capacitances of sensor capacitors 1 and 2 until the object has reached target position, i.e. voltages Ux and Uy are equal and the comparator starts to toggle and the object might oscillate around the target position. Given a resolution of 1 µm the toggling will be usually unnoticed. In case of a horizontal movement of the object any toggling movement around a target position can be suppressed, in case of vertical movement of the object the toggling movements will be performed to keep the target position against gravity. In a preferred embodiment of the invention toggling is indicated by the comparator by a "01010101" bit stream to the digital controller 5, any overshooting over the allowed range of movement is indicated by a "00000" bit stream and the digital controller 5 will have a motor to return to the range allowed. The following a multiplexer control table, mentioned earlier already, illustrates a sampling scheme of multiplexer 7:

| $12^{th}$ bit | UX | UY |
|---|---|---|
| LHS 0 | Ux = Uxmax | Ux = 0 |
| | Uy = 0 | Uy = DAC |
| RHS 1 | Ux = DAC | Ux = 0 |
| | Uy = 0 | Uy = Uymax |

As described earlier the $12^{th}$ bit controls whether the DAC defines a position on the left hand side (LHS) ($12^{th}$ bit 0), or on the right hand side (RHS) ($12^{th}$ bit 1).

In case of $12^{th}$ bit is 0, output Ux is set to the maximal output voltage Uxmax while Uy is held zero and the resulting voltage is sampled while signal SUX is high. Then output Uy is set to the desired output position value (DAC) while Ux is held zero and the resulting voltage is sampled while signal SUY is high.

In case of $12^{th}$ bit is 1 output Ux is then set to the desired output position value (DAC) while Ux is held zero and the resulting voltage is sampled when signal SUX is high. Then output Uy is set to the maximal output voltage Uymax while Ux is held zero and the resulting voltage is sampled when SUY is high.

In the table above "DAC" means the voltage representation of a certain motor position. As outlined earlier signals SUY and SUX are generated by the readout sequencer 501 shown in FIG. 1. In a preferred embodiment "DAC" has been provided by the digital controller in 11 bits to DAC 6. It is obvious that other numbers of bits are possible as well.

Figure 6:
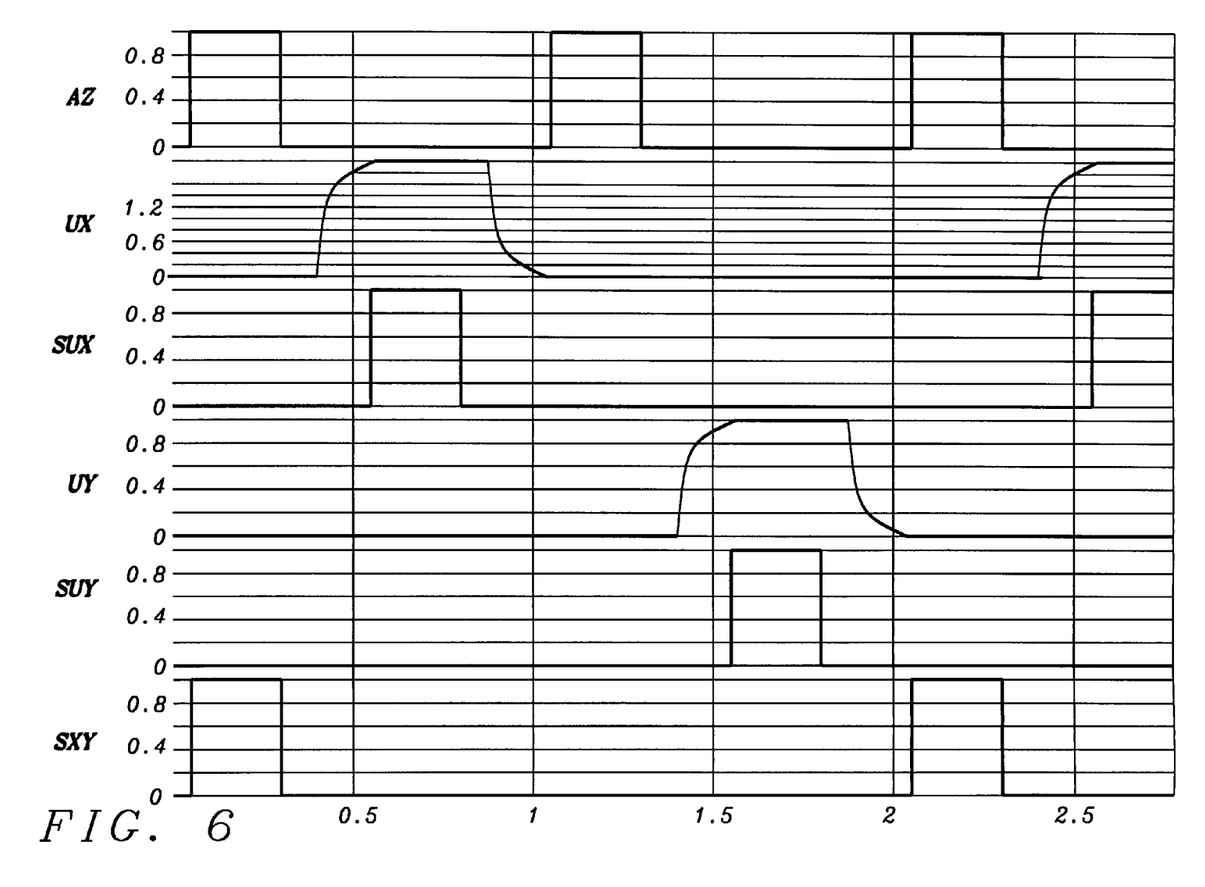
FIG. 6 illustrates pulse diagrams of the read-out circuit of the present invention

FIG. 6 illustrates pulse diagrams of the read-out circuit shown in FIG. 2. The table below outlines a legend of these pulse diagrams. As outlined earlier signals AZ, SUX, SUY, and SXY are generated by the readout sequencer 501 shown in FIG. 1. The numerals for switches and capacitors below refer to the block diagram of FIG. 2.

| | |
|---|---|
| AZ @ 50 ns | performs Autozero by enabling Switch 203 with Sensor Plates being grounded (S2/S4 enabled) |
| UX @ 300 ns | DAC set to Uxmax (assuming Goal Position is on LHS) Switch S5 are enabled. |
| SUX @ 550 ns | sampling Ux on capacitor 208 Comparison of Signals on capacitors 210 and 211 by ADC Comparator, |
| AZ . . . @ 1050 ns | performs Autozero with Sensor Plates being grounded |
| UY @ 1300 ns | DAC set to a lower-Value (assuming Goal Position is on LHS) switch S6 is enabled |
| SUY @ 1550 ns | sampling Uy on capacitor 209 With the raising edge of SUY the comparator result is sampled into digital control |
| SXY (next cycle AZ) @ 2050 ns | S7 and S8 are enabled and Ux and Uy are LP filtered and sampled on capacitors 210 and 211 |

In case the object should be moved to another target position a new set of voltages corresponding to the target position has to be set and the control loop will control the move to the new target position.

Low noise can be achieved by over-sampling of the control system. The sequential sensing of the sensor capacitors 1 and 2, the related discharging and the operation of the comparator 11 is performed in a frequency range of 500 kHz, while the response of the motor used is relative slow. The auto-zero method used by the amplifier 200 reduces noise and filters away 50-60 Hz artifacts and other low frequency artifacts.

An important feature of the present invention is that a long term stability of the system invented has been achieved by measuring the distance from a target position using instead of the absolute value of capacitances the ratio of the capacitances. There are no time constants required in the present invention, while in prior art applications often the capacitances of sensor capacitors are transferred into frequency or integration methods are utilized requiring time constant, which are usually not stable in the long term.

Figure 3:
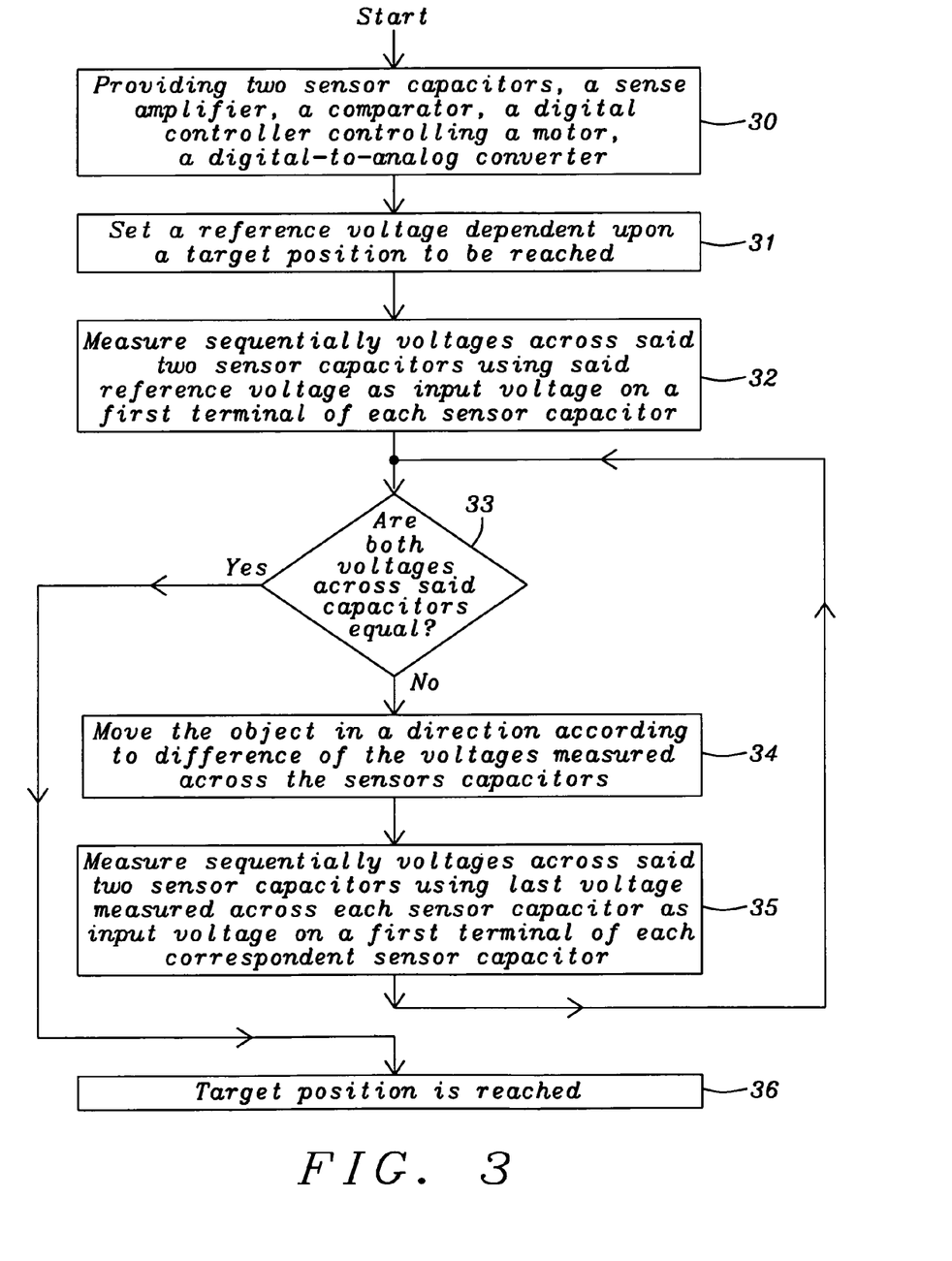
FIG. 3 illustrates a flowchart of a method invented to move an object to a target position.

FIG. 3 illustrates a flowchart of a method invented to read out capacitive sensors for distance measurement used by a position control system having a high accuracy and low noise. A first step 30 describes the provision of two sensor capacitors, a sense amplifier, a comparator, a digital controller controlling a motor, and a digital-to-analog converter. The following step 31 describes the setting of a reference voltage dependent upon a target position to be reached. In step 32 the voltages across said two sensor capacitors are measured sequentially and in step 33 the measured voltages across the sensor capacitors are compared, if both voltages are equal the process flow goes to step 36, wherein the target position is reached. If both capacitances are not equal the process flow goes to step 34 wherein the object is moved in a direction according to the difference of the capacitances measured. In the following step 35 the voltages across said two sensor capacitors are measured sequentially using last voltage measured across each sensor capacitor as input voltage on a first terminal of each correspondent sensor capacitor and then the process flow goes back to step 33.

While the invention has been particularly shown and described with reference to the preferred embodiments thereof, it will be understood by those skilled in the art that various changes in form and details may be made without departing from the spirit and scope of the invention.

What is claimed is:

1. A method to read out capacitive sensors for distance measurement used by a position control system having a high accuracy and low noise comprising the following steps:
   (1) providing two sensor capacitors, wherein at least one plate of said sensor capacitor is fastened on an object whose position is to be controlled, a sense amplifier stage, a digital controller controlling a motor, a digital-to-analog converter and a comparator;
   (2) setting a reference voltage dependent upon a target position to be reached;
   (3) measuring sequentially voltages across said two sensor capacitors using said reference voltage as input voltage on a first terminal of each sensor capacitor;
   (4) checking if both voltages are equal and, if positive go to step (7), otherwise go to step (5);
   (5) moving said object in a direction according to difference of the voltages measured across both sensor capacitors;
   (6) measuring sequentially voltages across said two sensor capacitors using last voltage measured across each sensor capacitor as input voltage on a first terminal of each correspondent sensor capacitor and go to step (4); and
   (7) target position is reached.

2. The method of claim 1 wherein one of said sensor capacitor is increasing its capacitance and the other is decreasing its capacitance if said object is moving.

3. The method of claim 1 wherein said object is moved by a linear motor.

4. The method of claim 1 wherein digital controller outputs sequentially two digital signals depending upon the actual position of the object.

5. The method of claim 1 wherein said sense amplifier is sensing sequentially a voltage across the sense capacitors while setting to zero between these measurements in an auto-zero mode.

6. The method of claim 5 wherein the output of said sense amplifier is stored in a pair of sample-and hold capacitors to enable Double-Correlated-Sampling.

7. The method of claim 1 wherein digital controller outputs signals to control the readout process chain.

8. The method of claim 7 wherein a read-out sequencer generates said signals to control the readout process chain.

9. A system to read out capacitive sensors for distance measurement used by a position control system having a high accuracy and low noise comprising:
   a digital controller, having inputs and outputs, wherein first inputs are signals from a comparator, a second input is a reference voltage defining a target position of an object, and a first output are control signals for a motor moving said object, a second output are two digital signals defining an actual position of said object, and a third output are signals to control the readout process chain;
   said motor;
   a digital-to-analog converter converting each one of said two digital output signals of said digital controller to an analog voltage;
   a multiplexing means modulating each of said analog voltage output of said digital-to-analog converters having two outputs, wherein alternately a first output is switched to a first plate of a first sensor capacitor and a second output is switched to a first plate of a second sensor capacitor;
   said two sensor capacitors having each one of their plates fastened on said object and one of their plates fastened on a fixed position;
   a sense amplifier stage having two inputs and an output, wherein a first input is connected to second plates of said sense capacitors and a second input is connected to a reference voltage and its output is connected to a sample-and-hold circuit;
   said sample-and hold-circuit having two branches, wherein each branch comprises capacitors and wherein a first branch is holding a voltage measured across said first sensor capacitor and a second branch is holding a voltage measured across said second sensor capacitor and wherein an output of said first branch is connected to an input of a first branch of a low pass filter and an output of said second branch is connected to a second branch of a low pass filter;
   said low-pass filter having two branches, wherein the output of the first branch is connected to a first input of a differential amplifier and the output of a second branch is connected to a second input of said differential amplifier;
   said differential amplifier having differential outputs wherein both differential outputs are the inputs of the comparator; and
   said comparator, comparing said differential inputs, having a digital output connected to said digital controller.

10. The system of claim 9 wherein said motor is a linear motor.

11. The system of claim 10 wherein said linear motor is a sledge motor.

12. The system of claim 9 wherein said sense amplifier stage comprises two differential gain stages and a high pass filter, wherein the output of a first differential gain stage is the input of said high pass filter and the output of said high pass filter is the input of a second gain stage and the output of said second gain stage is the input of said sample-and hold circuit.

13. The system of claim 12 wherein said high pass filter comprises two capacitors and a resistor, wherein a first terminal of a first capacitor is connected to a first output terminal of said first gain stage, a first terminal of a second capacitor is connected to a second output terminal of said first gain stage, a second terminal of said first capacitor is connected to a first input terminal of said second gain stage, a second terminal of said second capacitor is connected to a second input terminal of said second gain stage, and said resistor is connected between both said second terminals of said two capacitors.

14. The system of claim 12 wherein said first branch of the sample-and-hold circuit receives input from a first output of said second gain stage and said second branch of the sample-and-hold circuit receives input from a first output of said second gain stage and each branch comprises:

a switch converting the output signal from the second gain stage down to a baseband, and a capacitor connected between the output of said switch and ground.

15. The system of claim 14 wherein switches, which are linked to said multiplexer ensure that signals representing voltages measured across said both sensor capacitors are separately stored.

16. The system of claim 9 wherein said multiplexing means is operating in the order of magnitude of 500 kHz.

17. The system of claim 9 wherein said sample-and-hold circuit is using correlated double sampling.

18. The system of claim 9 wherein said two digital output signals of said digital controller defining each an actual position of said object comprise 11 bits.

19. The system of claim 9 wherein said capacitors of each branch of said sample-and-hold circuit are Poly Gate MOS capacitors.

* * * * *